(12) United States Patent
Ogawa (10) Patent No.: US 6,415,107 B1
(45) Date of Patent: Jul. 2, 2002

(54) PHOTOGRAPHIC INFORMATION STORAGE DEVICE

(75) Inventor: Hidehiro Ogawa, Funabashi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/480,119

(22) Filed: Jan. 10, 2000

Related U.S. Application Data (63) Continuation of application No. 08/497,085, filed on Jun. 30, 1995, now abandoned.

(30) Foreign Application Priority Data

Sep. 12, 1994 (JP) ............................................. 6-217440

(51) Int. Cl.⁷ .......................... G03B 7/00; G03B 17/18; H04N 5/76
(52) U.S. Cl. ....................... 396/310; 396/311; 396/321; 348/231; 348/232; 348/233
(58) Field of Search .................................. 396/300, 310, 396/311, 312, 319, 321, 502, 211; 348/231, 232, 233

(56) References Cited

U.S. PATENT DOCUMENTS

| | | | |
|---|---|---|---|
| 4,571,049 A | 2/1986 | Tsunefuji et al. | |
| 5,208,621 A | 5/1993 | Taniguchi et al. | |
| 5,610,723 A | 3/1997 | Yamagishi | |
| 5,697,004 A | 12/1997 | Saegusa et al. | |
| 5,852,467 A | * 12/1998 | Ogino | 348/231 |

* cited by examiner

Primary Examiner—Alan A. Mathews (57) ABSTRACT

A photographic information storage device equipped with a memory, which is able to store photographic information regarding pictures taken by a camera. A control device is provided which executes writing of the photographic information to the memory and interrupts the writing of the photographic information when the memory is full. When the control device has interrupted writing, a second control device enables writing by automatically cancelling the interruption command.

6 Claims, 5 Drawing Sheets

| 7 | 6 | 5 | 4 | 3 | 2 | 1 | 0 | MEANING OF EACH FLAG |
|---|---|---|---|---|---|---|---|---|
|   |   |   |   |   |   |   | 0 | DATA IS NOT STORED |
|   |   |   |   |   |   |   | 1 | DATA STORAGE |
|   |   |   |   |   |   | 0 |   | MEMORY NOT FULL |
|   |   |   |   |   |   | 1 |   | MEMORY FULL |
|   |   |   |   |   | 0 |   |   | NO DATA STORAGE INTERRUPTION |
|   |   |   |   |   | 1 |   |   | DATA STORAGE INTERRUPTION |

0: NOT SET
1: SET

FIG. 3(b)

|        | BIT |   |   | DATA STORAGE MODES |
|--------|-----|---|---|---|
|        | 2   | 1 | 0 | OF THE CAMERA |
| MODE 1 | 0 | 0 | 0 | INITIAL MODE |
| MODE 2 | 0 | 0 | 1 | DATA STORAGE SETTING |
| MODE 3 | 0 | 1 | 1 | MEMORY FULL |
| MODE 4 | 1 | 1 | 0 | STORAGE INTERRUPTION |
| MODE 5 | 1 | 0 | 1 | PHOTOGRAPHIC INFORMATION TRANSFER |
| MODE 6 | 0 | 0 | 1 | NEW FILM LOADING |

PHOTOGRAPHIC INFORMATION STORAGE DEVICE

This application is a Continuation of application Ser. No. 08/497,085, filed Jun. 30, 1995, now abandoned.

BACKGROUND OF THE INVENTION

1. Field of the Invention

The present invention relates to a storage device, and in particular, relates to a photographic storage device able to store the photographic information of a camera.

2. Description of the Related Art

Photographic information storage devices are known which are able to write photographic information, such as the aperture value of a photographic lens, to a memory inside the camera. Photographic information storage devices are also known which transfer stored photographic information to an external storage device outside the camera. In known photographic information storage devices, when the photographer commands the writing of the photographic information to the memory, the photographic information is written to the memory with each frame photographed. When memory runs out, the shutter release is disabled, and photography is no longer possible. At this point, the photographer is able to continue taking pictures, without writing photographic information, by performing an operation which interrupts the writing of the photographic information to the memory. Further, the photographer may also clear past entries from memory, by deleting or transferring photographic information, to free up space in the memory. However, when the writing of the photographic information to the memory is interrupted, even if space is created in the memory through the deletion of the photographic information or by transfer of the photographic information to an external storage device, writing of the photographic information is not restarted unless the photographer cancels the writing interruption.

SUMMARY OF THE INVENTION

Accordingly, it is an object of the present invention to provide a photographic information storage device for storing photographic information in a memory which, even if storing of the photographic information to the memory is interrupted, is able to enable storing of the photographic information without a conscious operation by the photographer.

Additional objects and advantages of the invention will be set forth in part in the description which follows, and, in part, will be obvious from the description, or may be learned by practice of the invention.

Objects of the present invention are achieved in a photographic information storage device for a camera, the photographic information storage device comprising a memory unit to store photographic information, and a control unit to write the photographic information to the memory unit, the control unit being adapted to interrupt the writing of photographic information to the memory unit when the memory unit is full and automatically resume writing of photographic information to the memory unit when the memory unit has available space.

Objects of the present invention are further achieved in a photographic information storage device for a photographic camera, the photographic information storage device comprising a storage unit for storing photographic information, a writing unit for writing the photographic information to the storage device, a writing interruption unit for interrupting the writing of the photographic information to the storage device, a mode changing unit which enables writing to the storage device, and a canceling unit which cancels the interruption of the writing of the photographic information to the storage device when the writing interruption unit interrupts the writing of the photographic information to the storage device and the mode changing unit enables writing to the storage unit.

Objects of the present invention are also achieved by a photographic information storage device comprising a storage device for storing photographic information regarding image information stored on a storage medium, a storage command unit for commanding the storage of the photographic information to the storage device, an interruption command unit for commanding the interruption of storage of the photographic information to the storage device when the storage device is full, a canceling unit for canceling the interruption of storage of the photographic information to the storage device when the full state of the storage device has been cancelled by means of the reading in, or the erasure, of stored data, a first identification unit for indicating whether the photographic information may be stored, a second identification unit for indicating whether the storage device is full, a third identification unit for indicating whether the storage of the photographic information has been interrupted, a first setting unit for setting the first identification unit to indicate that the photographic information may be stored in response to a storage command by the storage command unit, a second setting unit for setting the second identification unit to indicate that the storage device is full when there are no longer any regions for storing data, a third setting unit for setting the third identification unit to indicate that the storage of the photographic information has been interrupted in response to an interruption command by the interruption command unit, a storage execution unit for executing storage of the photographic information in response to a photographic operation when the first identification unit indicates that the photographic information may be stored, the second identification unit indicates that the storage device is not full, and the third identification unit indicates that the storage of the photographic information has not been interrupted, a storage interruption unit for interrupting storage of the photographic information when the third identification unit indicates that the storage of the photographic information has been interrupted, a first restart unit for setting the second identification unit to indicate that the storage device is not full and setting the first identification unit to indicate the photographic information may be stored when the second identification unit indicates that the storage device is full and the third identification unit indicates the storage of the photographic information has been interrupted, and a second restart unit for setting the third identification unit to indicate the storage of the photographic information has not been interrupted when a new film is inserted.

Objects of the present invention are also achieved in a photographic information storage device which is equipped with a storage unit for storing photographic information, a writing unit for writing the photographic information to the storage unit, a writing interruption unit for interrupting the writing of the photographic information by the writing unit, and a mode changing unit for changing the area of the storage unit where the photographic information is written to a mode in which writing of photographic information is again possible.

Objects of the present invention are also achieved in a photographic information storage device for storing photographic information in a camera wherein a canceling unit cancels an interruption of storing photographic information when the film of the camera has been changed after a mode changing unit has changed the mode.

Objects of the present invention are also achieved in a photographic information storage device wherein a storage unit is located inside a camera, and a mode changing unit, which, after the stored photographic information has been transferred to an external storage device, enables storing of further photographic information in the storage unit.

Objects of the present invention are also achieved in a photographic information storage device which is equipped with a storage command unit for controlling the storing of the photographic information, an interruption command unit for interrupting the storage of the photographic information, a canceling unit which cancels the storing of the photographic information when the storage area for the photographic information is insufficient, a first identification unit for determining if photographic information can be stored, a second identification unit for determining if the storage area for the photographic information is insufficient, a third identification unit for determining whether the storage of the photographic information is interrupted, a first setting unit for setting the first identification unit to a storage mode in response to a storage command of the storage command unit, a second setting unit for setting the second identification unit to a storage area insufficient mode when the storage area for the photographic information is insufficient, a third setting unit for setting the third identification unit to a storage interruption mode in response to an interruption command of the interruption command unit, a storage execution unit for storing the photographic information in response to the photographic operation when the first identification unit is in storage mode, the second identification unit is not in the storage area insufficient mode and the third identification unit is not in a storage interruption mode, a storage interruption unit for interrupting the storage of the photographic information when the third identification unit is in the storage interruption mode, a first restart unit for setting the second identification unit to a mode which is not the storage area insufficient mode and setting the first identification unit to the storage mode when the storage area insufficient mode has been canceled by the canceling unit when the second identification unit is in the storage area insufficient mode and the third identification unit is in the storage interruption mode, and a second restart unit for cancelling the setting of the storage interruption mode of the third identification unit when the film is changed.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Reference will now be made in detail to the present preferred embodiments of the present invention, examples of which are illustrated in the accompanying drawings, wherein like reference numerals refer to like elements throughout.

Figure 1:
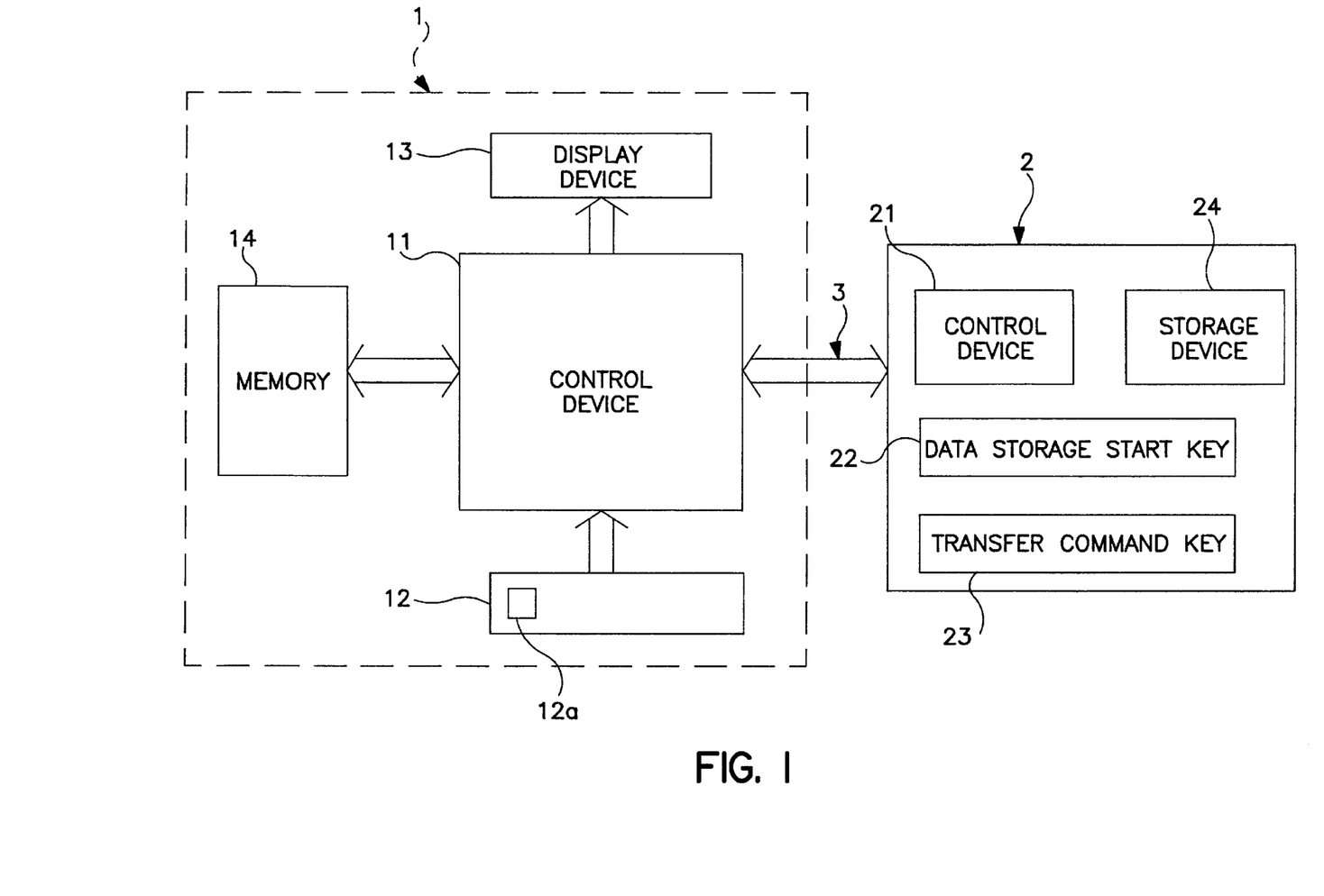
FIG. 1 is a block diagram of the control system of a photographic information storage device in accordance with a preferred embodiment of the present invention.

FIG. 1 is a block diagram of the control system of a photographic information storage device in accordance with a preferred embodiment of the present invention. The photographic information storage device in accordance with a preferred embodiment of the present embodiment is for use in a camera 1 and a personal computer 2 (hereinafter referred to as "PC"). The PC 2 operates as a storage device for photographic information, such as the shutter speed and aperture value, transferred from the camera 1 via a transfer cable 3. The camera 1 is equipped with a control device 11 which, in addition to executing the various computations and control programs necessary for taking pictures, controls the storage of photographic information to a photographic information memory 14. The control device 11 also operates to transfer the photographic information to the PC 2. A storage interruption button 12a, interrupts the storage of photographic information in the memory 14. A display device 13 displays the photographic information to the photographer.

The PC 2 is provided with a control device 21, which generally comprises a microcomputer and peripheral components. A data storage start key 22 commands storage of the photographic information in the memory 14. A transfer command key 23 transfers the photographic information which is stored in the memory 14 to the PC 2. A storage device 24, which preferably comprises a magnetic storage device such as a hard disk, stores the transferred photographic information. The control device 21 is also able to command the control device 11 to transfer the photographic information, which is stored in the memory 14, to the PC 2.

Figure 2:
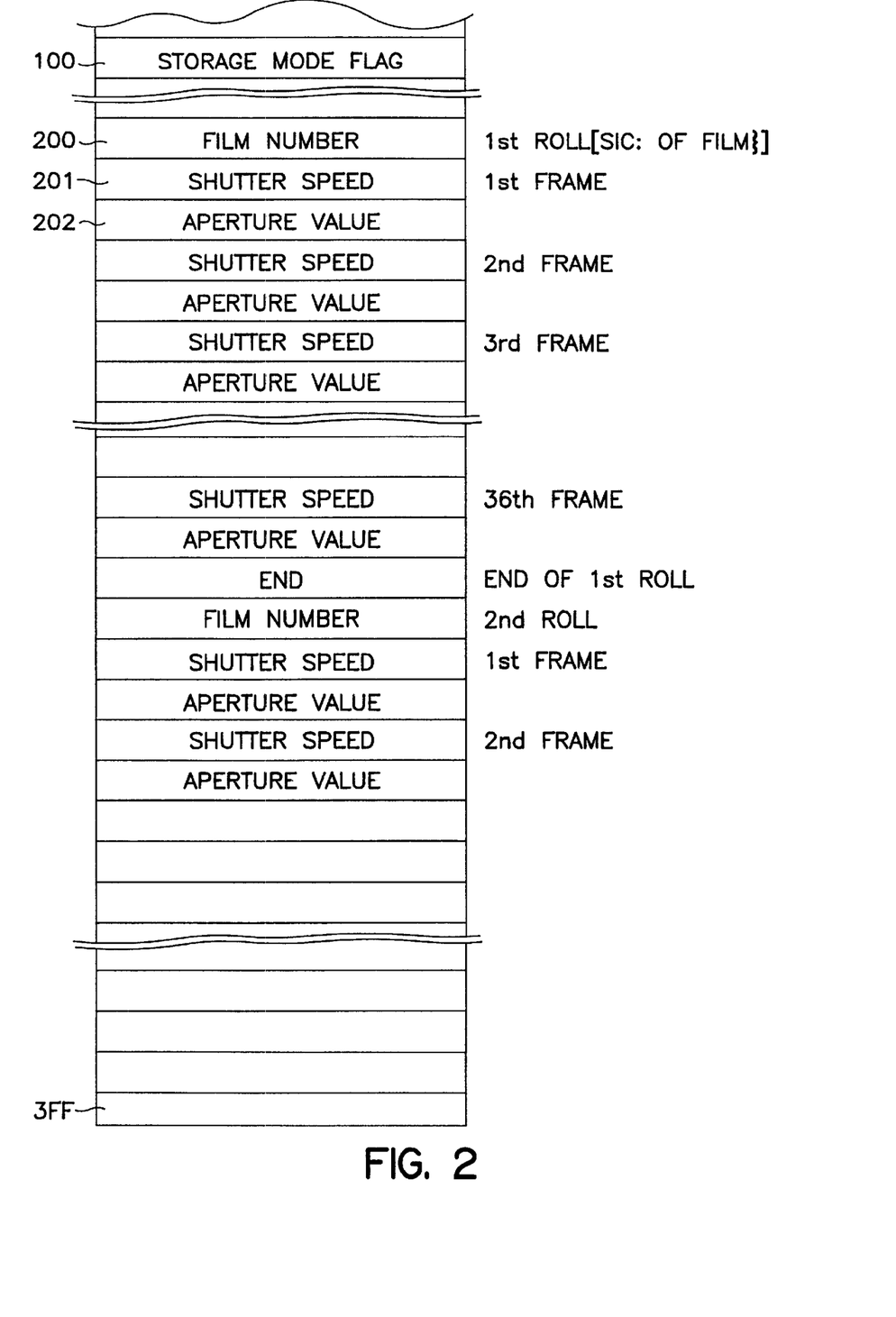
FIG. 2 is a diagram of the structure of the memory of the photographic information storage device in accordance with a preferred embodiment of the present invention.

FIG. 2 is a diagram of the structure of the memory of a photographic information storage device in accordance with a preferred embodiment of the present invention. The control device 11 assigns address 100h of the memory 14 as the storage area for a storage mode flag and assigns address 200h through 3FFh as a photographic information storage area. The storage mode flag at address 100h is used in performing control of photographic information storage in 1-byte units. Film number data, which indicates the film identification data of a first film roll, is stored at address 200h. A shutter speed used for the first frame is stored at address 201h. An aperture value used for the first frame is stored at address 202h. As each frame is shot, the associated shutter speed and aperture value are sequentially stored in the memory 14. When the last frame is shot, for example the 36th frame, the shutter speeds and aperture values for the 36th frame are stored, and a specified byte of data (hereinafter referred to as "END"), which designates the end of one roll of the film photographic information, is written in the next available address. The film photographic information for a second roll of film is stored in the subsequent addresses in the same form as the first roll. Although not shown in FIG. 2, an address counter, which stores the address where the photographic information is written, is stored in a specified position in the memory 14. The contents of the address counter are updated, in sequence, each time the photographic information is written to the memory 14.

Figure 3A:
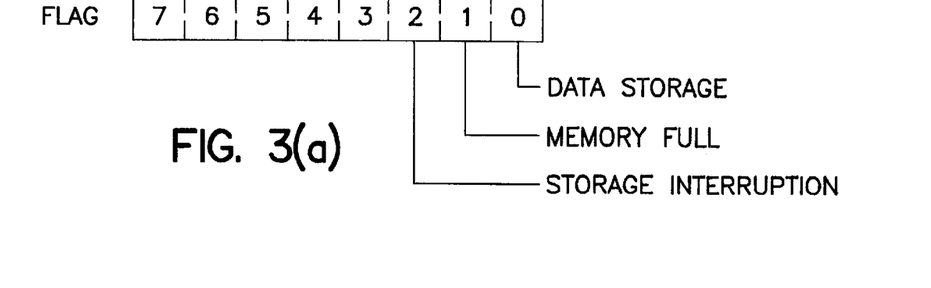
FIG. 3(a) is a diagram of a storage mode flag in the memory of the photographic information storage device in accordance with a preferred embodiment of the present invention.

FIG. 3(a) is a diagram of a storage mode flag in the memory of a photographic information storage device in accordance with a preferred embodiment of the present invention. A bit 0 is a data storage bit, which indicates whether the control device 11 is to store photographic information in the memory 14. A bit 1 is a memory full bit, which indicates whether space exists for storage of photographic information in the memory 14. A bit 2 is a storage interruption bit, which indicates whether the storage of photographic information in the memory 14 is to be interrupted. The remaining 5 storage mode bits are not used in the above embodiment of the present invention.

Figure 3B:
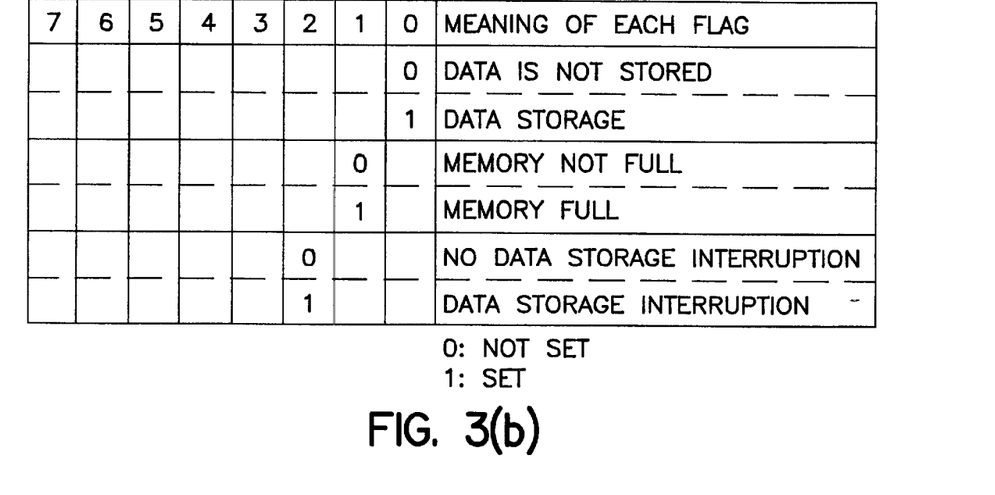
FIG. 3(b) is a diagram explaining the storage mode flag in the memory of the photographic information storage device in accordance with a preferred embodiment of the present invention.

FIG. 3(b) is a diagram explaining the storage mode flag in the memory of a photographic information storage device in accordance with a preferred embodiment of the present invention. When the data storage bit is set to "0", the photographic information is not stored in the memory 14. Conversely, when the data storage bit is set to "1", the photographic information is stored in the memory 14. When the memory full bit is set to "0", space for storing photographic information remains in the memory 14. Conversely, when the memory full bit is set to "1", no space for storing photographic information remains in the memory 14. When the storage interruption bit is set to "0", interruption of storage of photographic information in the memory 14 is canceled, i.e., the storage of photographic information is enabled. When the storage interruption bit is set to "1", the storage of photographic information to the memory 14 is interrupted.

Figure 3C:
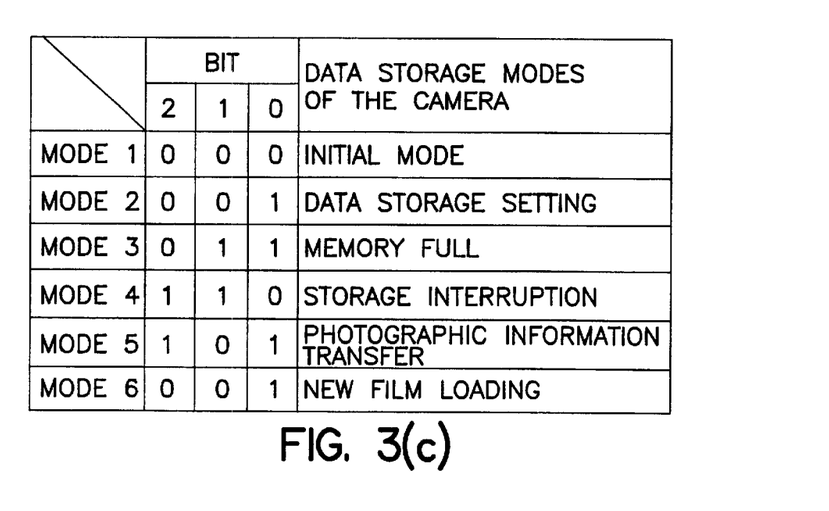
FIG. 3(c) is a diagram which indicates the camera's information storage modes, which result from combinations of the respective bits in the storage mode flag in the photographic information storage device in accordance with a preferred embodiment of the present invention.

FIG. 3(c) is a diagram which indicates the camera's information storage modes, which result from combinations of the respective bits in the storage mode flag in the photographic information storage device in accordance with a preferred embodiment of the present invention. Mode 1 is an initial mode, where storage of the photographed information in the camera is not commanded, space for writing photographic information exists in the memory 14, and storage interruption is not in effect. Mode 2 is a data storage setting mode, which stores photographic information in the memory 14. Mode 3 is a memory full status. Because there is no space in the memory 14 for the storage of photographic information even though the data storage bit is set, the memory full bit is set to "1", and shutter release is prohibited. Mode 4 is a storage interruption mode, where storage of photographic information to the memory 14 is interrupted in order to allow photography, even with the memory 14 being full. Mode 4 is entered by the pressing of the storage interruption button 12a. Mode 5 is a photographic information transfer mode. After photographic information has been transferred to the PC 2, depending on the storage mode flag, the data storage bit is set to "1" and the memory full bit is cleared to "0", if memory full status and storage interruption mode are in effect. The memory full status is cleared through the transfer, but the storage interruption bit is still set to "1", so storage of photographic information is not performed, even if the release operation is performed. Mode 6 is a storage mode used when a new film canister is loaded into the camera 1. Restarting of photographic information storage occurs when the storage interruption bit is cleared to "0" after the new film canister is loaded and fed to the first frame to be photographed. Mode 6 has the same bit pattern as Mode 2, which allows storage of photographic information to be restarted without operating the data storage start key 22.

Figure 4:
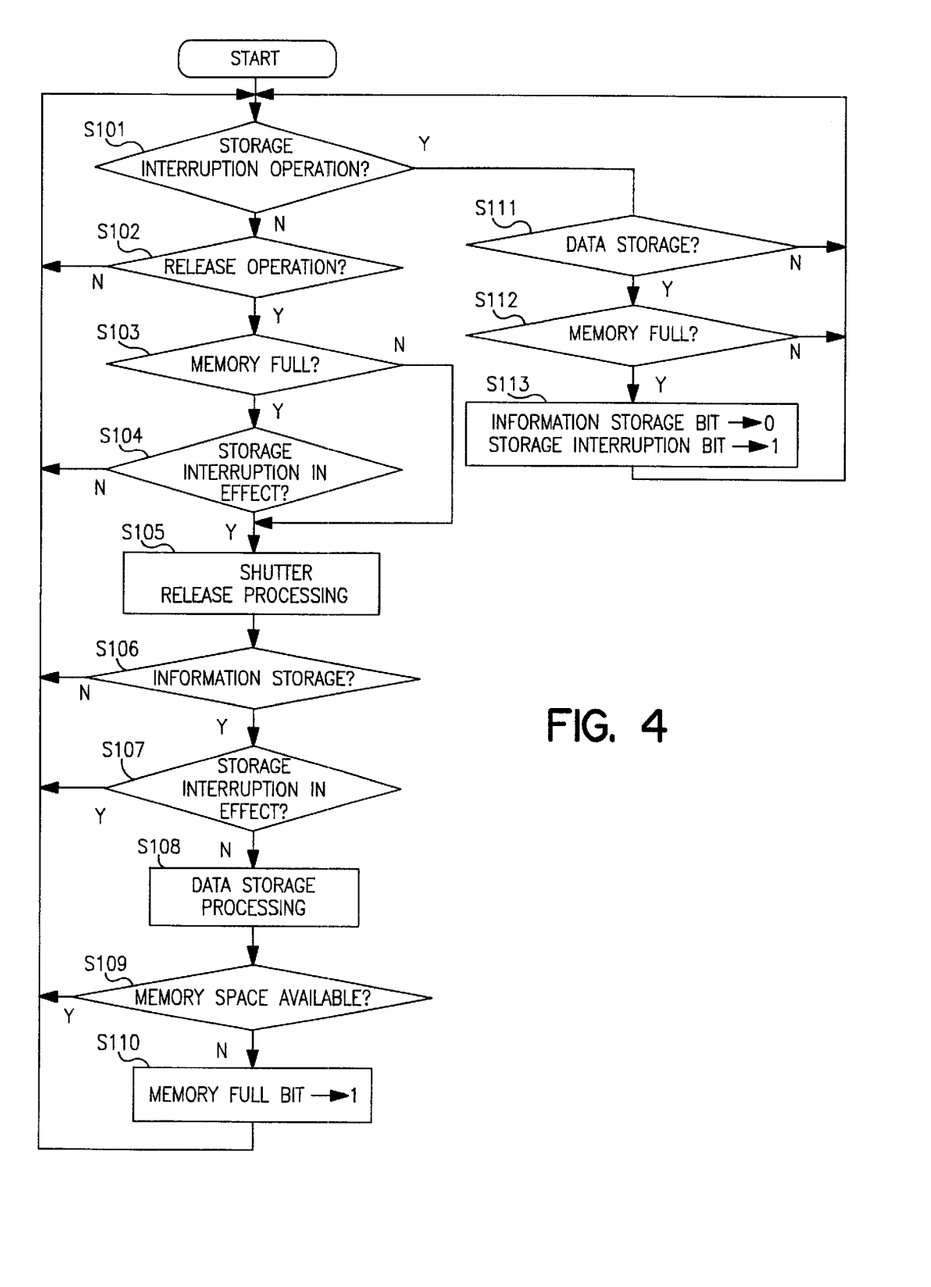
FIG. 4 is a flow chart of the procedure for storing photographic information in memory in the photographic information storage device in accordance with a preferred embodiment of the present invention.

FIG. 4 is a flow chart of the procedure for storing photographic information in memory in the photographic information storage device in accordance with a preferred embodiment of the present invention. The command for starting the storage of the photographic information to the memory 14 is issued by control device 21 when an input signal from the data storage start key 22 is received. The data storage bit 0 is then set to "1." When the photographing of one roll of film is completed, the control device 11 receives a film rewind signal, writes "END" in the memory 14 address specified by the address counter, and updates the address counter.

In step S101, the control device 11 determines whether the storage interruption operation has been performed, that is, whether an input signal has been received from the storage interruption button 12a. If a storage interruption operation has not been performed, the operation proceeds to step S102, and a judgment is made as to whether a release signal has been received from the shutter release button, i.e., whether the release operation has been performed. When the release operation has been performed, operation proceeds to step S103. When the release operation has not been performed, the operation returns to step S101.

In step S103, a determination is made as to whether the memory full bit is set to "1". When the memory full bit is set to "1", the operation proceeds to step S104. In step S104 a determination is made as to whether the storage interruption bit is set to "1." When the storage interruption bit is set to "1", operation proceeds to step S105. When the storage interruption bit is not set to "1", operation returns to step S101. Release processing is performed in step S105, and thereafter step S106 is executed. If there was a negative determination in step S103, operation proceeds to step S105.

In step S106, a determination is made as to whether the data storage bit is set to "1". When the data storage bit is set to "1", operation proceeds to step S107. When there has been a negative determination in step S106, operation returns to step S101. In step S107, a determination is made as to whether the storage interruption bit is set to "1." When the storage interruption bit is not set to "1" step S108 is executed. When the storage interruption bit is set to "1", operation returns to step S101. In step S108, the shutter speed and the aperture value are written to the address indicated by the address counter, and the address counter is updated. Next, in step S109, a determination is made as to whether there is space for writing photographic information in the memory 14. When it is judged that no space in the memory 14 exists, the step S110 is executed. When it is determined that there is space in the memory 14, operation returns to step S101. In step S110, the memory full bit is set to "1", and operation returns to step S101.

If after step S101, operation proceeds to step S111, and a determination is made as to whether the data storage bit is set to "1." When the data storage bit is set to "1", step S112 is executed. When there has been a negative determination in step S111, operation returns to step S101. In step S112, a determination is made as to whether the memory full bit is set to "1." When the memory full bit is set to "1", step S113 is executed. When there has been a negative determination in step S112, operation returns to step S101. In step S113, the data storage bit is set to "0", the storage interruption bit is set to "1", and operation returns to step S101.

When the release operation is performed during data storage mode, that is, when the memory full bit is "0", the data storage bit 0 is set "1", and the storage interruption bit is set to "0", the result of step S102 is affirmative, and the result of step S103 is negative. Thereafter, release, that is, picture taking, is performed in step S105. Similarly, if the result of step S106 is affirmative and the result of step S107 is negative, data storage processing is performed in step S108. Then, the result of step S109 is affirmative, and there is a return to step S101. When picture taking is repeated and memory full status results, the result of step S109 becomes negative, and the memory full bit is set to "1" in step S110. When the release operation is again performed, picture taking becomes impossible since the result of step S103 is affirmative, and the result of step S104 is negative. When the storage interruption button 12a is pressed in this mode, and the result of step S101 is affirmative, the storage bit is set to "0", and the storage interruption bit 2 is set to "1" through the operation of steps S111 through S113. Thus, the result of step S104 is affirmative, and picture taking is performed, but because the result of step S106 is negative, there is a return to step S101 without data storage processing being performed.

Figure 5:
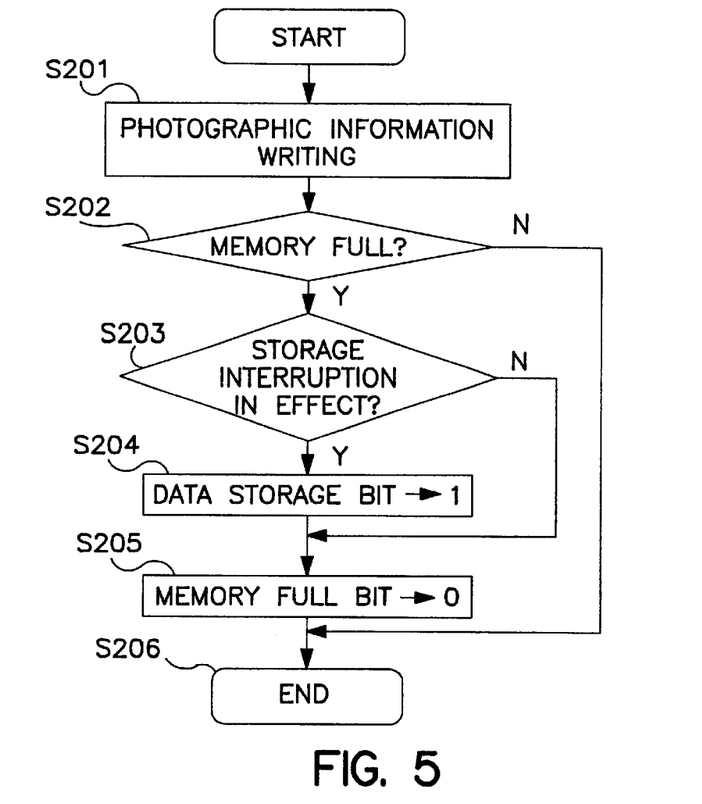
FIG. 5 is flow chart which shows the procedure for transferring photographic information from memory to a Personal Computer in the photographic information storage device in accordance with a preferred embodiment of the present invention.

FIG. 5 is a flow chart which shows the procedure for transferring photographic information from memory to the PC 2 in the photographic information storage device in accordance with a preferred embodiment of the present invention. A transfer of photographic information from the memory 14 to the storage device 24 is initiated by the control device 21 in response to the activation of the transfer command key 23 of the PC 2. First, in step S201, there is a request by the control device 21 to the control device 11 for the transfer of photographic information. The data contained in the memory 14 is transferred from the control device 11. Next, the data is read and written to the storage device 24. Thereafter, in step S202, a judgment is made as to whether the memory full bit is set to "1." When the memory full bit is set to "1", operation proceeds to step S203. In step S203, a determination is made as to whether the storage interruption bit is set to "1." When the storage interruption bit is set to "1", operation proceeds to step S204, and the data storage bit is set to "1." Next, in step S205, the memory full bit is set to "0." When there has been a negative determination in step S203, operation jumps to step S205. When there has been a negative determination in step S202, processing is ended.

Figure 6:
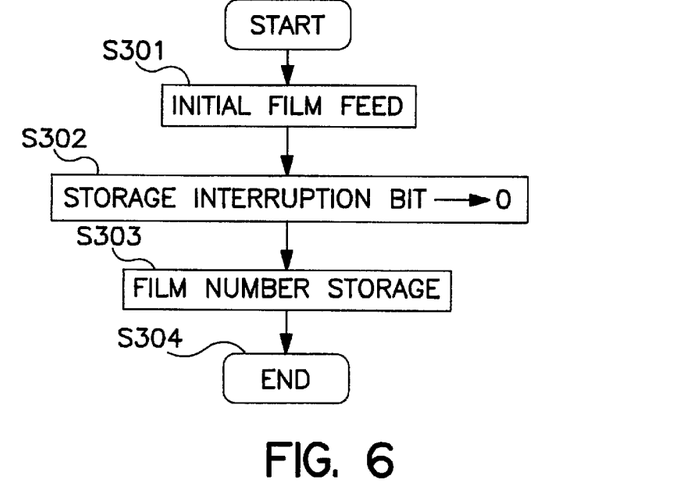
FIG. 6 is a flow chart which shows processing when the film is loaded in a camera equipped with the photographic information storage device in accordance with a preferred embodiment of the present invention.

FIG. 6 is a flow chart which shows processing when the film is loaded in a camera equipped with the photographic information storage device in accordance with a preferred embodiment of the present invention. In step S301, the film is wound to the first frame to be photographed. After this, in step S302, the storage interruption bit is cleared to "0", and in step S303, the film number is written to the address indicated by the address counter, the address counter is updated, and processing is ended. At the stage where the processing of FIG. 5 has been executed, the storage interruption bit remains at "1" even if the data storage bit is "1", and the memory full bit is "0." Thus, even if picture taking is executed after transfer, the result of step S107 in FIG. 4 is affirmative, and storage of photographic information cannot be restarted. Therefore, when new film has been loaded, the processing in FIG. 6 is executed, the storage interruption bit is cleared to "0", and storage of photographic information is restarted.

In the camera 1 according to a preferred embodiment of the present invention, picture taking can be performed even after storage interruption mode is in effect, so the frame which is being photographed cannot be determined immediately after transfer, and the photographic information and the photographed frame of film does not correspond.

Although the preferred embodiment of the present invention has been described with respect to a specific configuration, it will be recognized that the preferred embodiment is not limited to the specific configuration. For example, in the preferred embodiment, modification of the storage mode flag, such as updating the data storage bit and the memory full bit, is performed by control device 21 on the PC 2. However, after control device 11 receives an interruption signal for the completion of transfer of photographic information to the PC 2, it is also able to execute the steps starting with step S202 in FIG. 5. Moreover, while a button which corresponds to the data storage start key 22 is located on the camera side, the control device 11 can also be adapted to operate the data storage bit based on an input signal from that button. In such a case, if the PC 2 merely performs writing of the transferred photographic information to the storage device 24, separate processing can be executed thereafter. In the preferred embodiment, space is created in the memory for writing information through the transfer of information, but the present invention would also be effective if space is created in the memory by deleting photographic information.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A photographic information storage device for a camera, comprising:
    a memory that stores photographic information about each image including at least a shutter speed and an aperture value for each image; and
    a control that writes the photographic information to the memory in connection with the taking of each image, the control interrupting the writing of photographic information to the memory when the memory is full and automatically enabling writing of photographic information to the memory by canceling the interruption, when the memory has available memory and then film is loaded into the camera.

2. A photographic information storage device for a camera, comprising:
    an internal memory that stores photographic information about how each image was exposed including at least a shutter speed and an aperture value for each image; and
    a control that writes the photographic information to the memory in connection with the taking of each image, the control interrupting the writing of photographic information to the memory when the memory is full and automatically resuming writing of photographic information to the internal memory when the internal memory has available memory and in response to the insertion of new film into the camera.

3. The photographic information storage device of claim 2, further comprising an external storage device, wherein the control transfers photographic information stored in the internal memory to the external storage device.

4. The photographic information storage device for a camera of claim 2, wherein the control is adapted to prevent the camera from taking images when the internal memory is full.

5. A photographic information storage device for a camera, comprising:

an internal memory that stores photographic information about each image;

an external storage; and a control that writes the photographic information to the memory in connection with the taking of each image, the control interrupting the writing of photographic information to the memory when the memory is full and transferring photographic information in the internal memory to the external storage, the control subsequently and automatically, enabling writing of photographic information to the internal memory when the internal memory has available memory area and in response to the insertion of new film into the camera.

6. A photographic information storage device for an electronic camera, comprising:

a memory that stores photographic information about each image including at least a shutter speed and an aperture value for each image; and a control that writes the photographic information to the memory in connection with the taking of each image, the control interrupting the writing of photographic information to the memory when the memory is full and automatically enabling writing of photographic information to the memory by canceling the interruption, when the memory has available memory and then new storage medium is loaded into the camera.

* * * * *